(12) United States Patent
Smith et al.

(10) Patent No.: US 7,834,592 B2
(45) Date of Patent: Nov. 16, 2010

(54) CIRCUIT FOR GENERATING TRIANGULAR WAVEFORM HAVING RELATIVELY SHORT LINEAR RISE TIME AND SUBSTANTIALLY LONG LINEAR FALL TIME

(75) Inventors: Pete Ward Smith, Southlake, TX (US); James Earl Huffman, Keller, TX (US); David Lee Sykes, Keller, TX (US); Clyde Ray Calcote, Richardson, TX (US)

(73) Assignee: PulseTech Products Corporation, Southlake, TX (US)

( * ) Notice: Subject to any disclaimer, the term of this patent is extended or adjusted under 35 U.S.C. 154(b) by 259 days.

(21) Appl. No.: 12/238,271

(22) Filed: Sep. 25, 2008

(65) Prior Publication Data

US 2009/0085526 A1    Apr. 2, 2009

Related U.S. Application Data

(60) Provisional application No. 60/975,714, filed on Sep. 27, 2007, provisional application No. 60/975,707, filed on Sep. 27, 2007, provisional application No. 60/975,701, filed on Sep. 27, 2007.

(51) Int. Cl.
*H02J 7/10* (2006.01)
(52) U.S. Cl. .................. 320/141; 320/139; 320/145; 327/131; 327/134; 327/135; 327/137; 327/140; 363/20; 363/21.01; 363/21.08; 363/21.1
(58) Field of Classification Search ............ 320/139, 320/141, 145; 327/131, 132, 133, 134, 135, 327/136, 137, 138, 139, 140; 363/20, 21.01, 363/21.08, 21.1
See application file for complete search history.

(56) References Cited

U.S. PATENT DOCUMENTS

| | | | | |
|---|---|---|---|---|
| 3,497,791 A | * | 2/1970 | Moore | 320/139 |
| 3,959,707 A | * | 5/1976 | Stephens | 320/139 |
| 4,871,959 A | | 10/1989 | Gali | |
| 4,878,007 A | * | 10/1989 | Gabor et al. | 320/136 |
| 5,063,341 A | | 11/1991 | Gali | |
| 5,084,664 A | | 1/1992 | Gali | |
| 5,276,393 A | | 1/1994 | Gali | |
| 5,367,244 A | * | 11/1994 | Rose et al. | 320/141 |
| 5,463,304 A | * | 10/1995 | Winters | 320/139 |
| 5,491,399 A | | 2/1996 | Gregory et al. | |
| 5,525,892 A | | 6/1996 | Phommarath | |
| 5,583,416 A | * | 12/1996 | Klang | 320/160 |
| 5,589,757 A | * | 12/1996 | Klang | 320/160 |

(Continued)

*Primary Examiner*—Edward Tso
*Assistant Examiner*—Manuel Hernandez
(74) *Attorney, Agent, or Firm*—Gardere Wynne Sewell LLP

(57) ABSTRACT

A circuit includes a pulse transformer having primary and secondary windings. An oscillating waveform is applied to the primary winding to induce an oscillating waveform at the secondary winding. A transistor in series with a first resistor is coupled between the secondary winding and the ground. An R-C network formed by a second and a third resistor and a capacitor is coupled to a base junction of the transistor. The R-C network causes a slow, tapered linear pinch off of the transistor's conductance to enable the circuit to output a triangular waveform, which is characterized by a relatively short linear rise time followed by a substantially long linear fall time. The R-C network is coupled to the secondary winding via a first and a second diode, respectively.

16 Claims, 4 Drawing Sheets

U.S. PATENT DOCUMENTS

| | | |
|---|---|---|
| 5,592,068 A | 1/1997 | Gregory et al. |
| 5,614,805 A * | 3/1997 | Momotani et al. .......... 320/139 |
| 5,633,575 A | 5/1997 | Gali |
| 5,646,505 A * | 7/1997 | Melnikov et al. ........... 320/100 |
| 5,648,714 A | 7/1997 | Eryou et al. |
| RE35,643 E | 10/1997 | Gali |
| 5,747,969 A * | 5/1998 | Tamai ........................ 320/141 |
| 5,783,929 A * | 7/1998 | Taricco ....................... 320/139 |
| 5,891,590 A * | 4/1999 | King ........................... 429/49 |
| 6,184,650 B1 * | 2/2001 | Gelbman ..................... 320/100 |
| 6,242,886 B1 * | 6/2001 | Palanisamy et al. ......... 320/100 |
| 7,541,778 B2 * | 6/2009 | Maleus ....................... 320/141 |
| 7,786,702 B1 * | 8/2010 | Chait et al. ................. 320/145 |
| 2009/0085524 A1 * | 4/2009 | Smith et al. ................. 320/139 |
| 2009/0085525 A1 * | 4/2009 | Smith et al. ................. 320/139 |

* cited by examiner

US 7,834,592 B2

CIRCUIT FOR GENERATING TRIANGULAR WAVEFORM HAVING RELATIVELY SHORT LINEAR RISE TIME AND SUBSTANTIALLY LONG LINEAR FALL TIME

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 60/975,714, entitled PULSE CHARGING AND REJUVENATING CIRCUIT, and filed Sep. 27, 2007, U.S. Provisional Patent Application Ser. No. 60/975,707, entitled METHOD FOR PULSE CHARGING AND REJUVENATING A BATTERY, and filed Sep. 27, 2007, and U.S. Provisional Patent Application Ser. No. 60/975,701, entitled BATTERY PULSE CHARGING AND REJUVENATING CIRCUIT, and filed Sep. 27, 2007.

FIELD OF THE INVENTION

The invention relates to circuits for generating triangular waveforms, and more particularly the invention relates to a circuit for generating a triangular waveform having a relatively short linear rise time and a substantially long linear fall time.

BACKGROUND OF THE INVENTION

Triangular waveform generator circuits are used in a variety of applications. For example, triangular waveform generator circuits are used in microelectronics, telecommunications, and signal processing applications. Triangular waveform generator circuits are also used to charge and maintain rechargeable batteries. Existing charging circuits typically apply a charging signal to a battery to replenish its charge. Examples of such prior art circuits may be found in the U.S. Pat. Nos. 4,871,959, 5,084,664, 5,063,341, 5,276,393, and 5,633,575 and U.S. Reissue Pat. No. RE35,643, the disclosures of which are hereby incorporated by reference. In order to increase operating efficiency of a charging circuit, it is desirable to remove sulphate buildup in battery plates. Existing charging circuits do not efficiently remove sulphates from the battery plates.

SUMMARY

A circuit includes a pulse transformer having primary and secondary windings. The primary winding has first and second terminals and a center terminal to which is coupled a DC source. The secondary winding has third and fourth terminals. A first transistor is coupled between the second terminal of the primary winding and a ground. A first and a second resistor forms a voltage divider between the first terminal of the primary winding and the ground. The voltage divider has a tap node coupled to a base junction of the first transistor.

A second transistor in series with a third resistor is coupled between the third and fourth terminals of the secondary winding and the ground. An R-C network formed by a fourth and a fifth resistor and a capacitor is coupled to a base junction of the second transistor to cause a slow, tapered linear pinch off of the second transistor's conductance to enable the circuit to output a triangular waveform. The R-C network is coupled to the third and fourth terminals of the secondary winding via a first and a second diode, respectively.

A third transistor is coupled between the base junction of the first transistor and the ground. The third transistor is responsive to a pulse control signal to selectively turn ON and OFF the first transistor, wherein the pulse control signal is used to selectively prevent the generation of the triangular waveform. A third diode is coupled between the second terminal of the primary winding and the ground. A fifth resistor couples a second DC source to the base junction of the third transistor. A fourth diode couples an external battery to the third terminal of the secondary winding.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

Figure 1:
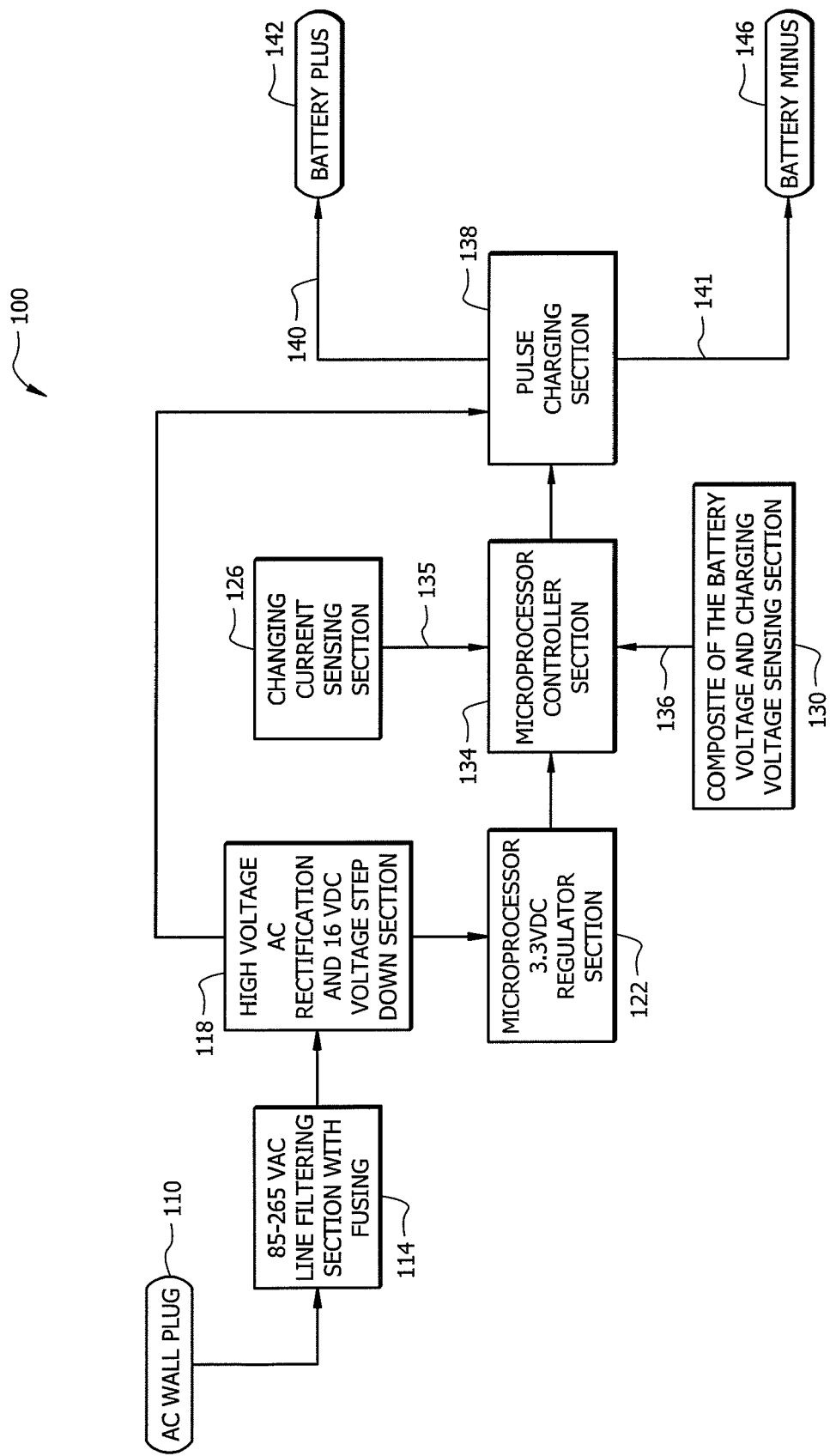
FIG. 1 is a block diagram of a battery charger in accordance with an example embodiment.

FIG. 1 is a block diagram of a battery charger 100 in accordance with an example embodiment. The battery charger 100 is adapted to receive an AC voltage (e.g., 85-265V AC) from an AC source such as a wall outlet 110. AC voltage from the wall outlet 110 is filtered at a filtering section 114 to reduce line emission. The filtering section 114 may include a safety fuse for over current protection.

A high voltage rectification and step down section 118 is coupled to the filtering section 114. The high voltage rectification and step down section 118 provides full-wave rectification of the AC voltage and produces a pulsating DC voltage. For example, the high voltage rectification and step down section 118 may rectify the 85-265V AC to a 120-375V pulsating DC. As will be appreciated, the full-wave rectification of a sinusoidal wave produces a pulsating DC voltage. Capacitors are used to filter or smooth out the DC voltage.

In one implementation, the high voltage rectification and step down section 118 converts the 120-375V DC into a regulated low voltage (e.g., 15V regulated DC). It will be appreciated that the 15 Volts DC is suitable for driving charging current into a typical 12V lead acid battery. In one implementation, a switching circuit and a step down transformer is used to convert the 120-375V DC voltage into the 15V regulated DC.

A microprocessor regulator section 122 and a microprocessor controller section 134 cooperatively generate a pulse control signal. It will be understood that the microprocessor regulator section 122 and the microprocessor controller section 134 may be incorporated, or merged, in a single device or they may be implemented as separate devices. The microprocessor regulator section 122 receives the 15V regulated DC and generates a 3.3V regulated DC to power and operate the microprocessor (as well as perhaps, other circuitry). The microprocessor controller section 134 monitors voltage and current of an external battery being charged through sensing circuits, 126 and 130, and responsive to the monitored voltage and current generates the pulse control signal 137. In one implementation, the microprocessor controller section 134 receives a current sense signal 135 from a charge current sense unit 126 and receives a voltage sense signal 136 from a voltage sense unit 130. In one implementation, the voltage sense signal 136 may represent a composite voltage, which may be computed from the battery voltage and the charging terminal output voltage. In response to the current sense signal 135 and the voltage sense signal 136, the microprocessor controller section 134 generates the pulse control signal 137. A pulse charging section 138 receives the pulse control signals 137 and in response generates a battery charging waveform, which is applied to a positive and a negative terminal, 142 and 146, of the external battery.

Figure 2:
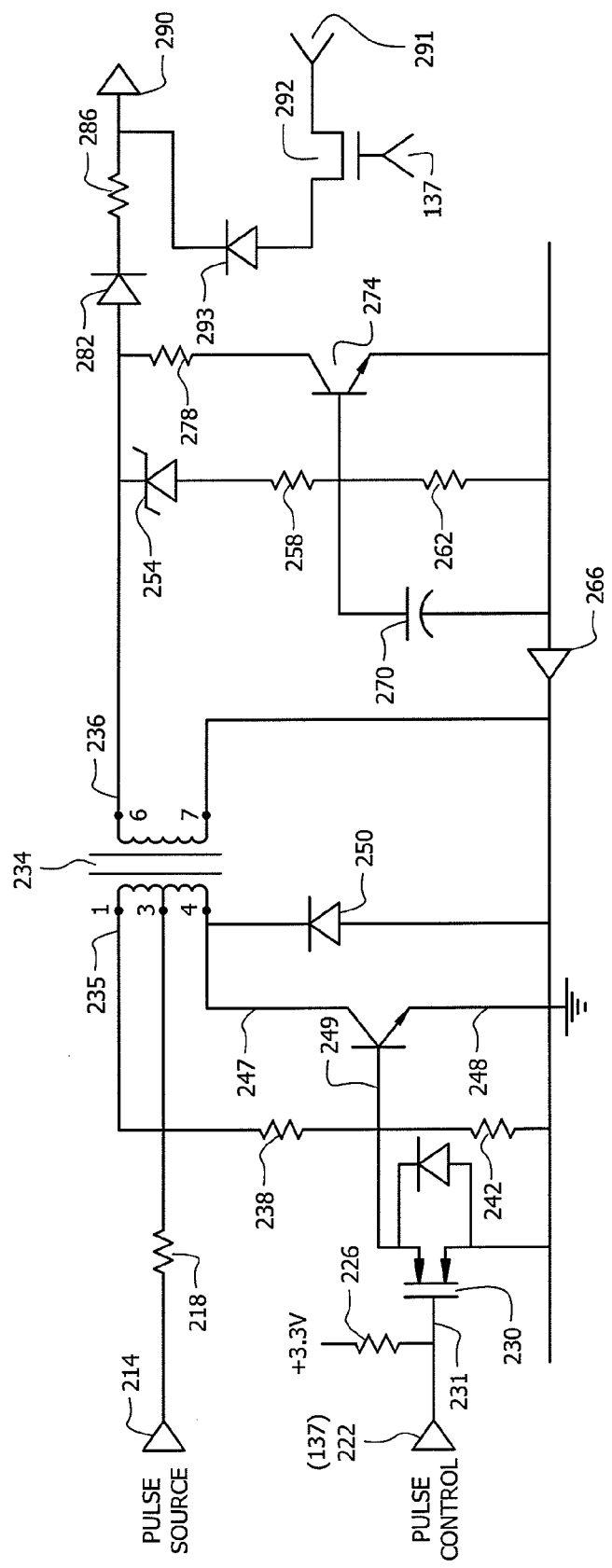
FIG. 2 illustrates a pulse charging circuit in accordance with one embodiment.

In one implementation, the pulse charging section 138 may be implemented with a pulse charging circuit comprising a pulse transformer. FIG. 2 illustrates a pulse charging circuit 200 having a pulse transformer 234. The pulse transformer 234 has a primary winding 235 and a secondary winding 236. The primary winding 235 has three terminals: terminal #1, terminal #4, and terminal #3 (center tap). A pulse source 214 (e.g., regulated 15V DC) is coupled to the center tap (terminal #3) of the primary winding 234 through a limiting resistor 218. A transistor 246 includes a collector junction 247 coupled to the terminal #4 of the primary winding and includes an emitter junction 248 coupled to ground, thus providing a current flow path from the terminal #4 to the ground when the transistor 246 is turned ON. A resistor network formed by resistors 238 and 242, coupled between the terminal #1 of the primary winding and the ground, provide another current flow path from the terminal #1 of the primary winding to the ground.

The resistors 238 and 242 are coupled to a base junction 249 of the transistor 246. When a current flows from the terminal #1 and through the resistors 238 and 242, a base current is supplied to the base junction 249 to turn ON the transistor 246.

As will be appreciated, when the transistor 246 is turned ON, current flows from the center tap (terminal #3) through the terminal #4 and into the ground. When the transistor 246 is turned OFF, current flows from the center tap (terminal 3) through the terminal 1, the resistors 238 and 242 and into the ground.

As discussed before, when current flows from the terminal #1 through the resistors 238 and 242, the transistor 246 is turned ON, causing the transistor 246 to allow current to flow from the terminal # 4 through the transistor 246 and into the ground. Due to the conduction of current through the transistor 246, current does not flow through the resistors 238 and 242, thus removing the necessary base current from the base junction 249. Consequently, the transistor 246 turns OFF, which in turn causes the current to flow again through the resistors 238 and 242. Thus, the resistors 238 and 242 and the transistor 246 induce oscillation at the primary winding 235 of the pulse transformer 234.

In one implementation, a pulse control signal 222 (which may be the pulse control signal 137 shown in FIG. 1) generated by the microprocessor (shown in FIG. 1) is utilized to turn OFF the oscillation in the primary winding 235. Specifically, the pulse control signal 222 is coupled to a gate junction 231 of a transistor 230 to turn ON the transistor 230, which in turn pulls the base junction 249 of the transistor 246 to ground. A resistor 226 couples a 3.3V source to the gate junction 231. When the transistor 230 is turned ON, the transistor 246 turns OFF, thus halting the oscillation.

The oscillation in the primary winding 254 of the transformer 234 induces AC voltage at terminals 6 and 7 of the secondary winding 236. A transistor 274 in series with a resistor 278 is coupled between the terminals 6 and 7 of the secondary winding. Thus, when the transistor 274 is turned on, current flows from the terminal 6 through and the transistor 274 to the terminal 7. An R-C network formed by resistors 258 and 262 and a capacitor 270 is coupled to a base junction 275 of the transistor 274. Diodes 254 and 266 couple the R-C network to the terminals 6 and 7, respectively. The diode 266 functions as a half-bridge rectifier blocking a return path of the AC current. The diode 254 clips the oscillating signal wave at 15+ volts causing the base junction 275 of the transistor 274 to slowly conduct to ground via the R-C network formed by the resistor 262 and the capacitor 270. A diode 282 in conjunction with the resistor 278 and the transistor 274 produces a pulse waveform at an output terminal 290. A DC bias signal is added to the pulse waveform, and the resulting pulse waveform superimposed on the DC bias signal is applied to the external battery (not shown in FIG. 2). The pulse waveform superimposed on the DC bias signal is also referred to as the battery charging signal. The battery charging signal is characterized as a triangular or sawtooth signal superimposed on a DC bias signal. As will be explained further, depending on the battery condition, the circuit 200 is either operated in a charging mode or in a maintenance mode. In the charging mode, the battery charging signal (i.e., the triangular or sawtooth signal superimposed on the DC bias signal) is applied to the battery. In the maintenance mode, the battery's settling voltage is continuously monitored. If the battery's settling voltage falls below a threshold value, the charging signal is turned ON until the battery's settling voltage reaches the threshold value. The charging signal is turned OFF or removed when the battery's settling voltage reaches the threshold value.

The R-C network causes a slow, tapered linear pinch off of transistor 274's conductance so as to control the pulse shape. The diode 282 prevents the external battery from discharging through the circuit 200. A resettable fuse 286 may be connected in series with the diode 282 for short circuit protection. In one implementation, the pulse control signal 137 (shown in FIG. 1) is used to control a switch 202 to remove the DC bias signal from the output terminal 290. A diode 293 connected in series with the switch 292 prevents the battery from discharging through the switch 292. It will be understood that the DC bias signal may be selectively removed from the output terminal 292 using a variety of other circuitry.

Figure 3A:
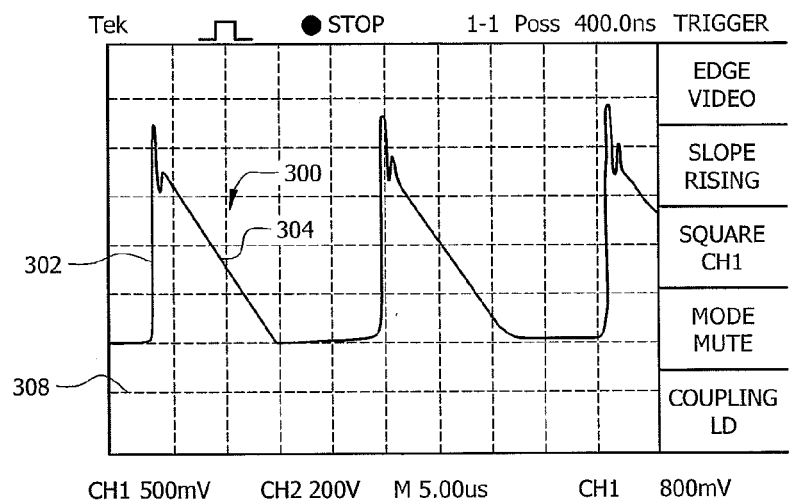
FIG. 3A illustrates a waveform generated by the pulse charging circuit in accordance with one embodiment.

FIG. 3A illustrates a waveform 300 generated by the pulse charging circuit 200. As discussed above, the slow, tapered linear pinch off of the transistor 274's conduction results in a triangular or sawtooth waveform. The triangular or sawtooth waveform 300 is superimposed on a DC bias signal 308, and the resulting battery charging waveform is a triangular or sawtooth waveform superimposed on a DC bias signal. The battery charging waveform is also referred to herein as a pulse modulated waveform or a pulse modulated signal. The triangular or sawtooth waveform 300 is characterized by a relatively short linear rise time 302 (e.g., 412 million V/sec) followed by a substantially long linear fall time 304 (e.g., 40 million V/sec). It will be understood that the pulse charging circuit 200 can be modified to generate the triangular waveform having other rise time and fall time values. In one implementation, the ratio of the rise time to fall time is approximately 1:10, thus resulting in a relatively short rise time and a substantially long fall time. The waveform 300 has a frequency between 30-50 KHz. The short linear rise time 302 and a substantially long linear fall time 304 of the triangular or sawtooth waveform 300 provides a larger area under the curve, which enables the waveform 300 to possess increased charging and desulphating capability. The short linear rise time 302 and the relatively long linear fall time 304 of the triangular or sawtooth waveform 300 provide increased desulphating voltage and current to the external battery being charged. It will be appreciated, the increased desulphating voltage and current removes sulphates from the lead plates of the battery, thus improving battery condition.

In one implementation, the pulse charging circuit 200 is operated in a charging mode and a maintenance mode. During the charging mode (when the pulse control signal 222 is active and the DC bias signal is active), the triangular or sawtooth waveform 300 is superimposed on the positive DC bias signal (e.g., 15V DC) 308. As discussed before, the triangular or sawtooth waveform 300 provides increased desulphating voltage and current to the battery. As will be appreciated, during the charging mode, the base line of the waveform is the DC bias voltage.

During the maintenance mode, the charging signal (i.e., the triangular or sawtooth waveform superimposed on the DC bias signal) is deactivated or removed and the battery's settling voltage is continuously monitored. If the battery's settling voltage falls below a threshold value, the charging signal is turned ON until the battery's settling voltage reaches the threshold value. The charging signal is turned OFF or removed when the battery's settling voltage exceeds the threshold value.

In one implementation, a microprocessor generates the control signal 137 to selectively operate the pulse charging circuit 200 in the charging mode and the maintenance mode. The charging algorithm may be stored in a memory which is either within the microprocessor or provided as a separate component connected to the microprocessor. For example, the pulse control signal 222 (also the signals 137) may be generated by the microprocessor.

Figure 3B:
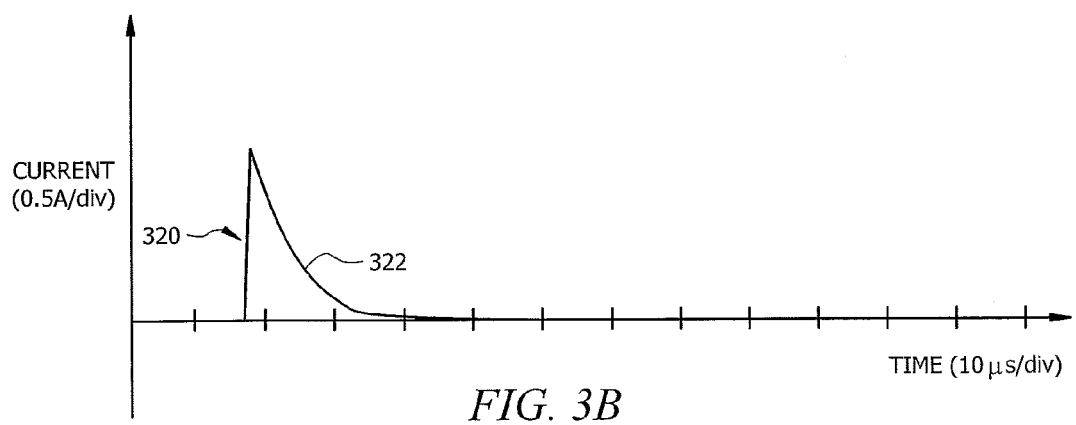
FIG. 3B is a waveform generated by a prior art circuit.

FIG. 3B is a waveform 320 generated by a pre-existing circuit. The waveform 320 has a frequency of approximately 8 KHZ and exhibits a logarithmic fall time 322, resulting in a comparatively smaller area under the curve than the area under the curve of the triangular or sawtooth waveform 300.

Figure 4:
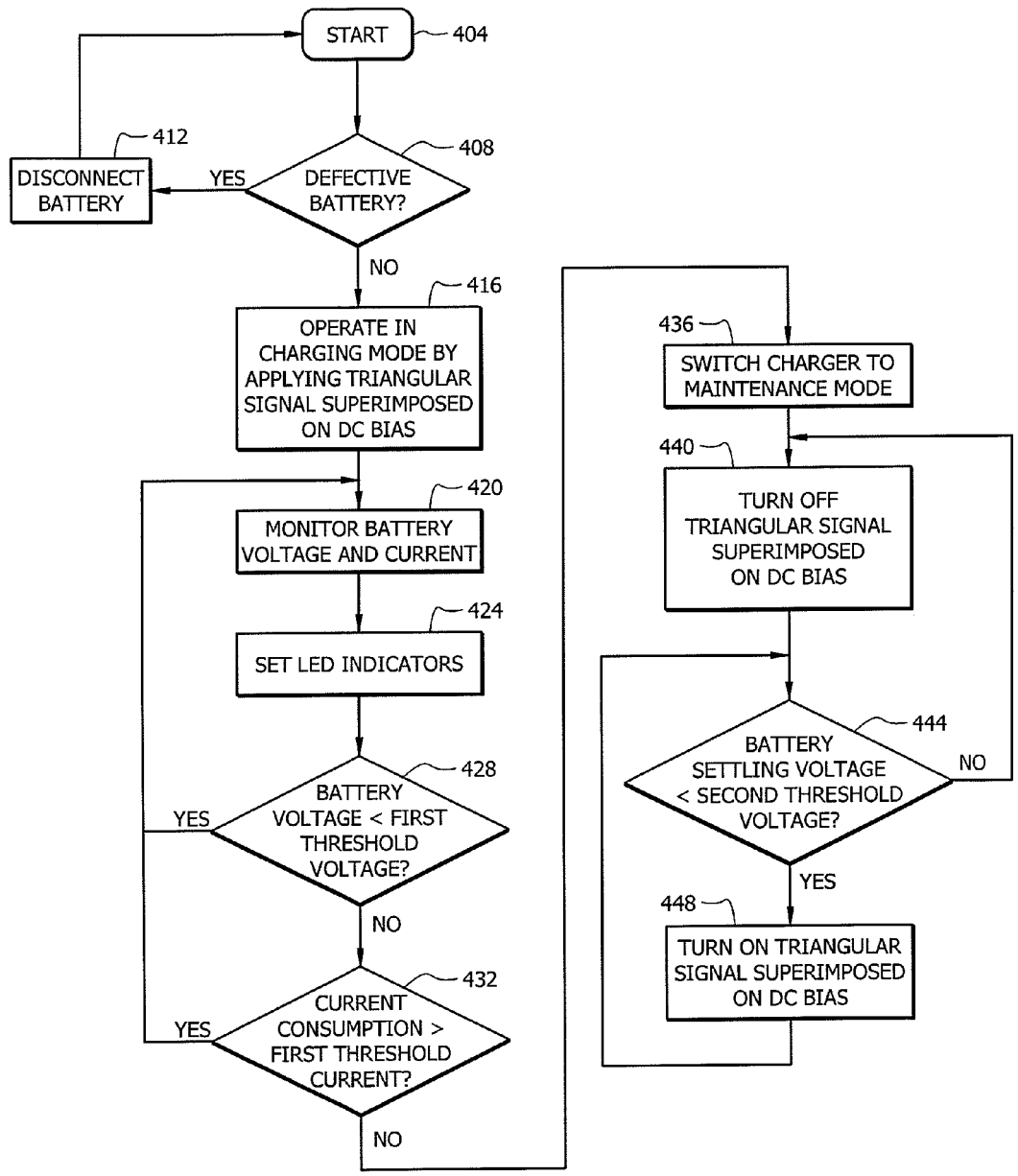
FIG. 4 is a flow diagram of the steps for charging a battery in accordance with one embodiment.

FIG. 4 is a flow diagram of the steps for charging a battery in accordance with one embodiment. The flow starts in step 404 in which an external battery is connected to a charger circuit in accordance with the embodiments discussed above. In step 408, the battery is tested or analyzed to determine if the battery is defective. If the battery is found to be defective, the battery is disconnected in step 412 and the flow returns to step 404. If the battery is found not to be defective, the flow moves to step 416 in which the charger circuit is operated in a charging mode.

As discussed before, depending on the charge level of the battery and in response to the pulse control signal 222, the charger is operated in a charging mode or in a maintenance mode. During the charging mode, a positive DC charging voltage (e.g., 15V DC) is added to a triangular or sawtooth waveform, and the resulting signal is applied to the battery. The signal is characterized by the triangular or sawtooth waveform superimposed on the DC bias signal. The triangular or sawtooth waveform desulphates the battery by removing sulphate buildup on the lead plates.

In step 420, real time data related to the battery voltage and current is acquired. In one implementation, voltage and current values are stored in a memory coupled to the microprocessor. In step 424, LED indicator settings are determined based on the acquired data, and LED indicators are set to indicate the battery's status. For example, the LED indicators may indicate that the charging circuit is in a charging mode or in a maintenance mode.

In step 428, a comparison is made whether the battery voltage is less than a first threshold voltage (e.g., 14.2V DC). In one implementation, a composite value of the voltage reading of the battery and the charger is used to estimate the voltage. If the composite value of the voltage reading is less than 14.2V DC, the flow returns to step 420. If the composite value of the voltage reading is equal or greater than 14.2V DC, the flow moves to step 432 wherein a determination is made regarding the current consumption of the battery. The current consumption of the battery can be determined from the data acquired in step 420. Referring back to step 432, if the current consumption is greater than a first threshold current (e.g., 0.75 Amp), the flow returns to step 420. Thus, it will be appreciated that if the battery is drawing more than 0.75 Amp, the battery is considered not fully charged by the pulse charging circuit (although the battery voltage satisfies the first threshold) and the flow returns to step 420.

If the current consumption is less than or equal to 0.75 Amp (along with the high battery voltage), the battery is considered fully charged, and the flow moves to step 436, wherein the charger circuit is switched to the maintenance mode. In step 440, the triangular waveform superimposed on the DC bias signal is deactivated or turned OFF. In step 444, the battery's settling voltage is compared to a second threshold voltage. If the battery's settling voltage falls below a second threshold voltage (e.g., 13.6V DC), the flow moves to step 448 wherein the triangular waveform superimposed on the DC bias signal is applied to the battery and the flow subsequently returns to step 444. If the battery's settling voltage level remains equal to or above 13.6V DC, the flow returns to step 440.

While the charging method and operation is described in connection with lead acid batteries, it will be understood that the charging method and operation disclosed herein may also be used in connection with other battery types.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A circuit, comprising:
   a pulse transformer having primary and secondary windings, the primary winding having first and second terminals and a center terminal to which is coupled a DC source node, the secondary winding having third and fourth terminals;
   a first transistor coupled between the second terminal of the primary winding and a ground node;
   a first and a second resistor forming a voltage divider between the first terminal of the primary winding and the ground node, the voltage divider having a tap node coupled to a base junction of the first transistor;
   a second transistor in series with a third resistor coupled between the third and fourth terminals of the secondary winding and the ground node; and
   an R-C network formed by a fourth and a fifth resistor and a capacitor, the R-C network coupled to a base junction of the second transistor to cause a slow, tapered linear pinch off of the second transistor's conductance to enable the circuit to output a triangular waveform, the R-C network coupled to the third and fourth terminals of the secondary winding via a first and a second diode, respectively.

2. The circuit according to claim 1, further comprising a third transistor coupled between the base junction of the first transistor and the ground node, the third transistor responsive to a pulse control signal to selectively turn ON and OFF the first transistor, wherein the pulse control signal is used to selectively prevent the generation of the triangular waveform.

3. The circuit according to claim 1, further comprising a third diode coupled between the second terminal of the primary winding and the ground node.

4. The circuit according to claim 1, further comprising a fifth resistor for coupling a second DC source to the base junction of the third transistor.

5. The circuit according to claim 1, further comprising a fourth diode coupling an external battery to the third terminal of the secondary winding.

6. The circuit according to claim 1, wherein the triangular waveform is characterized by a relatively short linear rise time followed by a substantially long linear fall time.

7. The circuit according to claim 1, wherein the triangular waveform has a linear rise time of approximately 412 million V/sec.

8. The circuit according to claim 1, wherein the triangular waveform has a linear fall time of approximately 40 million V/sec.

9. The circuit according to claim 1, wherein the triangular waveform has a frequency between 30 KHz and 50 KHz.

10. The circuit according to claim 1, wherein the fourth and the fifth resistors are connected in series, and wherein the capacitor is connected in parallel to the fifth resistor forming a common node of the R-C network to which is coupled the base junction of the second transistor.

11. The circuit according to claim 1, further comprising a third diode coupling an external battery to the secondary winding, the external battery being charged by the application of the triangular waveform.

12. The circuit according to claim 1, wherein the triangular waveform is applied to a battery being charged.

13. The circuit according to claim 1, wherein the triangular waveform is superimposed on a DC bias signal and the resulting waveform is applied to a battery.

14. The circuit according to claim 13, wherein the triangular waveform has a linear rise time of approximately 412 million V/sec.

15. The circuit according to claim 13, wherein the triangular waveform has a linear fall time of approximately 40 million V/sec.

16. The circuit according to claim 13, wherein the triangular waveform has a frequency between 30 KHz and 50 KHz.

* * * * *